United States Patent
Fagundes et al.

(10) Patent No.: US 8,488,772 B2
(45) Date of Patent: Jul. 16, 2013

(54) GROUPING OF CONTACT CENTER AGENTS

(75) Inventors: Luciano Godoy Fagundes, São Paulo (BR); Tommy Moran, Galway (IE); Veeranna A. Yamanappa, Pune (IN); Mohammad Khan, Pune (IN); Dhaval Desai, Pune (IN); Joylee E. Kohler, Northgleen, CO (US); Andrew D. Flockhart, Westminster, CO (US); Robert C. Steiner, Westminster, CO (US)

(73) Assignee: Avaya Inc., Basking Ridge, NJ (US)

( * ) Notice: Subject to any disclaimer, the term of this patent is extended or adjusted under 35 U.S.C. 154(b) by 0 days.

(21) Appl. No.: 13/115,657

(22) Filed: May 25, 2011

(65) Prior Publication Data

US 2012/0300920 A1 Nov. 29, 2012

(51) Int. Cl.
*H04M 3/00* (2006.01)
*H04M 5/00* (2006.01)

(52) U.S. Cl.
USPC ............ 379/265.05; 379/265.06; 379/265.12; 379/265.13

(58) Field of Classification Search
USPC ............. 379/265.05, 265.06, 265.07, 265.08, 379/265.12, 265.13
See application file for complete search history.

(56) References Cited

U.S. PATENT DOCUMENTS

| | | | |
|---|---|---|---|
| 6,731,609 B1 | 5/2004 | Hirni et al. | |
| 7,203,655 B2 * | 4/2007 | Herbert et al. | 705/7.42 |
| 2006/0093123 A1 * | 5/2006 | Becerra et al. | 379/265.01 |

OTHER PUBLICATIONS

PMSI, KPI Examples, http://www.pmsi-consulting.com/Resources/KPI-Examples.aspx, Retrieved Jul. 15, 2011, 2 pages.
Business Intelligence Simple, Practical & Affordable, http://www.elegantjbi.com/Solutions/Business_BI_customer_profile.htm, Retrieved Jul. 15, 2011, 2 pages.
Customer Impact, http://www.customerimpact.com/enterprise-feedback-solutions, Retrieved Jul. 15, 2011, 3 pages.

\* cited by examiner

*Primary Examiner* — Ahmad Matar
*Assistant Examiner* — Nafiz E Hoque
(74) *Attorney, Agent, or Firm* — Maldjian Law Group LLC; John P. Maldjian, Esq.; Alexander D. Walter, Esq.

(57) ABSTRACT

Agents in a contact center are grouped dynamically by defining performance metrics against which agents are to be judged, and generating an evaluation score for each of a number of agents by comparing their actual performance data to the defined performance metrics. Agents are assigned to the groups based on their performance scores. This provides the ability to generate reports and route contacts according to actual agent performance judged relative to user-specified performance metrics. The sizes of groups can be adjusted in real time to take account of actual or anticipated levels of contacts with different requirements, and agents can be reallocated among the resized groups on the fly based on the ranking of their evaluation scores.

27 Claims, 3 Drawing Sheets

GROUPING OF CONTACT CENTER AGENTS

BACKGROUND

1. Field of the Invention

The present invention relates to methods and systems for grouping contact center agents. Such grouping is useful in segmenting a set of agents with similar characteristics in order to route contacts to agents of a particular group and/or for reporting on contact center and agent performance and activities.

2. Description of Related Art

In a contact center (often referred to as a call center) agents have traditionally been assigned to skillset groups. Thus an agent may have skillsets such as "English", "Portuguese", "Sales", "Digital Camera Technical Support", and so on. These skillsets may be used to define agent groups with contacts being routed to one or more such agent groups either by queuing or by pooling contacts and matching agents to contacts in that pool. The skillset groupings may also be employed for reporting and statistical purposes, so a revenue report might be defined for all agents sharing the skillsets of (say) "Portuguese" and "Sales."

Current contact center skillset parameters are static. Usually, agents will receive a grade indicating how good or bad they are for a particular skillset. These are the parameters that a routing algorithm can use to move agents from one skill to the other. It requires manual interaction from the supervisor to promote or demote an agent for a particular skillset.

Reconfiguring such agent groups is time consuming and changing an agent's grouping for reporting purposes may impact on unintended areas such as by affecting contact routing. Furthermore, where a new group or skillset is created for the purposes of reporting, agents must be individually assigned to the new group or skillset, or such reassignment must take place by combining and filtering the existing skillset assignments for agents.

One example of a traditional method of organizing an agent queue is disclosed in U.S. Pat. No. 6,731,609.

An additional problem arises for alternative models of contact centers. For example, if a contact center is designed to match contacts to agents without the use of traditional skillsets, then the imperative to maintain detailed skillset assignments for each agent no longer exists, and this has a knock-on effect when it comes to reporting as agents cannot be easily segmented and characterised in the absence of skillset assignments.

Events occurring outside the contact center may expose inadequacies in traditional ways of characterising and grouping agents. For example, an airline contact center may have a fixed ratio of sales agents to customer service agents, and perhaps those customer service agents will be assigned to different geographical areas (e.g. East coast, Midwest, West coast, etc.). If a severe weather event occurs on, for example, the East Coast, then this may dramatically alter not only the relative levels of calls between the geographic groups, but also the ratio of customer service calls to sales calls. Reassigning agents to achieve the optimum level of customer service is a difficult and skilled task for experienced supervisors, who will usually be in a "fire fighting" mode where they are reacting and attempting to fix problems that have already manifested themselves in excessive wait times and abandoned calls.

SUMMARY

Embodiments of the present invention provide a method of grouping contact center agents comprising:

(a) maintaining, for a set of contact center agents associated with a contact center, performance data relating to the activities of the contact center agents;

(b) specifying one or more performance metrics against which the performance data of the contact center agents may be evaluated;

(c) determining an evaluation score for each of a plurality of the contact center agents against the performance metric(s) based on the performance data; and (d) assigning the plurality of contact center agents among a plurality of agent groups according to each agent's respective evaluation score.

An embodiment of the method allows the dynamic creation and maintenance of agent groups based on any specified performance metric against which agent performance data can be scored. In this way, contact center supervisors and administrators are not limited to pre-existing agent skillsets or other grouping characteristics in order to segment a set of contact center agents.

In an embodiment of the present invention, the step of specifying one or more performance metrics comprises creating an agent profile having a desired set of characteristics expressed as the one or more performance metrics, and the step of determining an evaluation score evaluates the extent to which each of the plurality of agents matches that agent profile. The agent profile may be an idealised agent profile or may be based on performance data for an agent of the contact center.

In an embodiment of the present invention, the step of specifying one or more performance metrics comprises specifying a number, n, of performance metrics P in numerical form as a set of values $(p_1, p_2, \ldots p_n)$, and further comprising expressing, for each of the plurality of agents, a corresponding set of performance data Q in numerical form as a set of values $(q_1, q_2, \ldots q_n)$.

Further, the step of determining an evaluation score S comprises evaluating for each agent the expression:

$$S = \sqrt{\sum_{i=1}^{n} c_i (q_i - p_i)^2}$$

where $c_i$ represents a weighting constant.

An embodiment of the method of determining an evaluation score is based on an n-space Euclidian distance, with each performance metric $p_i$ and the corresponding data point $q_i$ representing a respective distance along a respective axis from an origin, so the equation evaluates the overall "distance" of the agent's performance data point $(q_1, q_2, \ldots q_n)$ from the reference point $(p_1, p_2, \ldots p_n)$. The weighting constant permits adjustment of disparate values for different metrics. For example if one metric is "sales" expressed as a dollar amount (e.g. with a desired reference value of 10,000) and another metric is "handling time" expressed in seconds (e.g. with a desired target of 120), a large weighting factor might be applied to the handling time to boost the importance of a five second improvement in handling time relative to a five dollar improvement in sales.

Thus, where the performance metrics have three elements $p_1, p_2, p_3$, and assuming that no weighting factor is required ($c_1 = c_2 = c_3 = 1$), then the score for an agent with performance data $q_1, q_2, q_3$ will be:

$$S = \text{SQRT}((q_1 - p_1)^2 + (q^2 - p_2)^2 + (q_3 - p_3)^2)$$

Care needs to be taken with this method of evaluating an agent score in this manner as it treats overachievement and underachievement equally. For example, if a desired handling time is expressed as 120 (seconds) then a corresponding agent performance of 100 seconds will be equally distant from this target as a corresponding agent performance of 140 seconds.

It will therefore be appreciated that this may be corrected by applying a different weighting where overachievement is found to have occurred (as an arbitrary example: $c_1=5$ where q1>p1, and $c_1=0.75$ where q1<p1), or indeed by using a different scoring algorithm to evaluate agent performance against a desired target.

An alternative algorithm to evaluate performance data against a performance metric is to define for each performance metric a base value b and a target value t, and to evaluate, for a performance data value d the expression (|d−b|)/(|t−b|) so that for example for the handling time has a base (worst) value of b=300 seconds and a target value of t=120 seconds, then two agents with respective average handling times of d=100 and d=140 seconds respectively would be assigned scores (for this single performance metric) of 1.111 and 0.889 respectively. Such scores could equally be expressed in percentage terms as 111% and 89% of target respectively.

As before, these individual scores can be combined with other scores in weighted sums so that for each of a set of n performance metrics defined by a base and target pair (b,t) and having a corresponding performance data value d, the evaluation score is calculated as:

$$S = \sqrt{\sum_{i=1}^{n} c_i \left( \frac{|d_i - b_i|}{|t_i - b_i|} \right)^2}$$

where each performance metric has a respective weighting factor c.

It will be appreciated that many other algorithms for evaluating performance against a set of metrics are available and contemplated by embodiments of the present invention.

In an embodiment, the method further comprises: updating the performance data for the set of agents over time, and repeating steps (c) and (d) to thereby dynamically update the assignment of agents among agent groups to take into account the updated performance data.

The step of assigning the plurality of contact center agents among a plurality of agent groups comprises selecting, from a ranked list of the evaluation scores, a subset of consecutively ranked scores, and assigning to a group those agents represented by the subset.

Such a subset of consecutively ranked scores might, for instance, be the top 10 scores, the bottom 13% of scores, the middle 50% of scores, or the 40th to 60th percentile of scores.

Further, the step of assigning the plurality of contact center agents among a plurality of agent groups comprises maintaining a set of M agent groups and dividing the ranked list of the evaluation scores into M subsets, each subset comprising a number of consecutively ranked scores, and assigning to each of the M agent groups those agents represented by one of the M subsets of consecutively ranked scores.

In this way, a set of M ranked agent groups are created with a first group containing the top ranked agents, the next group containing the next ranked agents, and so on.

An embodiment of the method further includes the step of defining a size of one or more of the agent groups and assigning to the one or more of the agent groups a number of agents in accordance with the defined size.

Thus, the groups need not be equal in size but can be predefined to meet reporting or contact matching needs, and can be dynamically adjusted as necessary. This provides a major benefit over the conventional method of grouping agents using agent-defined skills and attributes because it avoids the necessity of manually reallocating agents by increasing or decreasing their skill or ranking, and instead automatically allows agents to fall into groups of any arbitrary size based on their evaluation scores.

The step of defining a size of one or more groups can comprise defining a number of agents for each of the one or more agent groups. For example a first (top-ranked) group might be twenty agents, a second (bottom ranked) group might be fifteen agents, and a third (middle ranked) group might be everyone else.

The step of defining a size of one or more groups can alternatively comprise defining a relationship between the respective sizes of the one or more agent groups, and assigning the agents in proportion to the relationship. For example, the top, middle and bottom ranking groups of agents might be defined in the proportions 30:50:20, with agents being allocated in these proportions based on ranking.

The step of defining a size of one or more groups can involve determining a contact service requirement based on actual or anticipated numbers of contact to be serviced by the one or more groups and defining the size of the one or more agent groups to meet the contact service requirement.

As one example, the contact service requirement may be determined by predicting contact numbers based on historical trends. Alternatively or additionally, the contact service requirement may be determined by predicting contact numbers based on inputs defining events external to the contact center.

The contact service requirement can be adjusted in real time to take account of current contact numbers.

Embodiments of the method may further comprise generating a report of activity at the contact center using the agent groups as a report parameter. For example, a report may segment agents based on the groupings, or a report may be generated specifically for one or more of the groups only.

Embodiments of the method may comprise assigning a contact to an agent by allocating the contact to one of the agent groups and matching the contact to an agent within the one of the agent groups.

This is beneficial because the top performing agents (according to whatever criteria a user may have defined) can be grouped together, taking account of the most up-to-date history available, and such a grouping of agents can be assigned to service a particular set of contacts for whom it has been determined that service by the top ranking agents is needed.

Embodiments of the method may also include the steps of defining one or more agent attributes, filtering the set of agents according to the one or more attributes to arrive at an attribute-specific subset of agents, and performing the step of assigning the plurality of contact center agents among a plurality of agent groups for each attribute-specific subset of agents.

Thus, an initial set of contact center agents (which may be all agents, or only those meeting initial specified criteria) can be filtered by attributes such as language or skill abilities, and then for each attribute-specific subset, groups can be created. In this way, one might generate top, middle and bottom ranked groups of agents for each of a number of languages.

In another embodiment, the method further comprises:
(e) allocating a set of contacts requiring service at the contact center between a plurality of contact groups, each contact group being associated with one or more of the agent groups;

(f) based on the relative resources required to service each of the contact groups, calculating a corresponding size requirement for the one or more agent groups associated with each contact group;

(g) reassigning the plurality of contact center agents among the plurality of agent groups in proportion to the calculated size requirements and according to each agent's respective evaluation score.

This additional set of steps enables the relative numbers of agents in each agent group to be adjusted to take into account actual or expected contact numbers which the agent group is required to service, with agents being reallocated based on the evaluation scores, In this way, the size and composition of agent groups is dynamically adjusted to actual or expected contact traffic, which again is not possible using traditional skillset assignments and groupings.

In one scenario, the step of allocating the set of contacts between a plurality of contact groups involves looking at current or historical contact numbers having shared characteristics.

In another scenario, the step of allocating the set of contacts between a plurality of contact groups involves predicting contact numbers. The prediction may be based on historical trends and/or on external events.

It is also possible to blend these approaches, such that actual contact numbers are evaluated along with contact number predictions based on external events, for instance, to arrive at an expected number of contacts with a set of shared characteristics which define a contact group.

Each contact group may be serviced by one or several agent groups, according to the business requirements of the contact center.

More specifically, the distribution of agents between the groups can be altered to try and match the agent distribution to, for example, incoming call distribution. If it is expected that approximately 25% of the incoming calls will be from high-value customers, 60% of the calls will be "normal" calls, and 15% of the incoming calls will be other types of calls, then the associated agent groups can be readjusted such that the top 25% of agents (according to an evaluation score based on skill level or some other agent-proficiency characteristic) are placed in a first agent group designated to handle calls from high-value customers, the next 60% of agents not of the top-tier but of adequate skill level are placed in a second agent group designated to handle "normal" calls, and the remaining 15% of agents are placed in a third group designated to handle the other calls. When calls are received they are designated to be assigned to one of the three groups and then an agent from the appropriate group can be selected to service the call.

In one embodiment, there is also provided a method of routing a contact at a contact center to an agent of the contact center, comprising:

(a) maintaining, for a set of contact center agents associated with a contact center, performance data relating to the activities of the contact center agents;

(b) specifying one or more performance metrics against which the performance data of the contact center agents may be evaluated;

(c) determining an evaluation score for each of a plurality of the contact center agents against the performance metric(s) based on the performance data;

(d) assigning the plurality of contact center agents among a plurality of agent groups according to each agent's respective evaluation score;

(e) receiving a contact and allocating the contact to at least one agent group based on a characteristic of the contact; and (f) assigning the contact to an agent within the at least one agent group.

There is further provided an embodiment of a method of grouping contact center agents, the method comprising:

(a) ranking a plurality of contact center agents according to a performance metric;

(b) allocating a set of contacts requiring service at the contact center between a plurality of contact groups;

(c) based on the relative resources required to service each of the contact groups, calculating a corresponding size requirement for a plurality of agent groups to service the contact groups wherein each contact group is associated with one or more of the agent groups; and (d) assigning the plurality of contact center agents among the plurality of agent groups in proportion to the calculated size requirements and according to each agent's respective ranking.

Each method defined above may be implemented in computer software which, when executed in a computing system associated with a contact center, causes the computing system to execute the steps of the method.

Such computing systems may be dedicated or suitably programmed general purpose computer systems and may be stand-alone or distributed systems. The software is preferably provided as a set of instructions on a non-transitory data carrier.

Accordingly, there is also provided a computer program product comprising a non-transitory data carrier encoding instructions which when executed in a computing system associated with a contact center, cause the computing system to:

(a) maintain, for a set of contact center agents associated with a contact center, performance data relating to the activities of the contact center agents;

(b) specify one or more performance metrics against which the performance data of the contact center agents may be evaluated;

(c) determine an evaluation score for each of a plurality of the contact center agents against the performance metric(s) based on the performance data; and (d) assign the plurality of contact center agents among a plurality of agent groups according to each agent's respective evaluation score.

There is additionally provided a computer program product comprising a non-transitory data carrier encoding instructions which when executed in a computing system associated with a contact center, cause the computing system to:

(a) maintain, for a set of contact center agents associated with a contact center, performance data relating to the activities of the contact center agents;

(b) specify one or more performance metrics against which the performance data of the contact center agents may be evaluated;

(c) determine an evaluation score for each of a plurality of the contact center agents against the performance metric(s) based on the performance data;

(d) assign the plurality of contact center agents among a plurality of agent groups according to each agent's respective evaluation score;

(e) receive a contact and allocating the contact to at least one agent group based on a characteristic of the contact; and (f) assign the contact to an agent within the at least one agent group.

There is further provided a computer program product comprising a non-transitory data carrier encoding instructions which when executed in a computing system associated with a contact center, cause the computing system to:

(a) rank a plurality of contact center agents according to a performance metric;
(b) allocate a set of contacts requiring service at the contact center between a plurality of contact groups;
(c) based on the relative resources required to service each of the contact groups, calculate a corresponding size requirement for a plurality of agent groups to service the contact groups wherein each contact group is associated with one or more of the agent groups; and
(d) assign the plurality of contact center agents among the plurality of agent groups in proportion to the calculated size requirements and according to each agent's respective ranking.

Additionally, an embodiment of the present invention provides a contact center system comprising:
(a) a data store in which performance data relating to the activities of a set of contact center agents associated with a contact center are stored;
(b) a performance metric definition record in which a performance metric is recorded against which the performance data of the contact center agents may be evaluated;
(c) a processor programmed to determine an evaluation score for each of a plurality of the contact center agents against the performance metric(s) based on the performance data; and
(d) an agent group record defining a plurality of agent groups and recording details of the allocation of the plurality of contact center agents among the plurality of agent groups according to each agent's respective evaluation score.

There is additionally provided a contact center system comprising:
(a) a data store in which performance data relating to the activities of a set of contact center agents associated with a contact center are stored;
(b) a performance metric definition record in which a performance metric is recorded against which the performance data of the contact center agents may be evaluated;
(c) a processor programmed to determine an evaluation score for each of a plurality of the contact center agents against the performance metric(s) based on the performance data;
(d) an agent group record defining a plurality of agent groups and recording details of the allocation of the plurality of contact center agents among the plurality of agent groups according to each agent's respective evaluation score; and
(e) a contact handling system programmed to allocate a contact at the contact center to at least one agent group based on a characteristic of the contact, whereby the contact may be subsequently assigned to an agent within the at least one agent group.

There is further provided a contact center system comprising:
(a) an agent ranking record which records the ranking of a plurality of contact center agents according to a performance metric;
(b) a contact analysis system programmed to allocate a plurality of contacts requiring service at the contact center between a plurality of contact groups;
(c) a processor programmed to calculate a corresponding size requirement for a plurality of agent groups to service the contact groups wherein each contact group is associated with one or more of the agent groups, the calculation being based on the relative resources required to service each of the contact groups; and
(d) an agent group record defining a plurality of agent groups and recording details of the allocation of the plurality of contact center agents among the plurality of agent groups according to each agent's respective ranking.

BRIEF DESCRIPTION OF THE DRAWINGS

The present invention will now be further illustrated with reference to the following description of embodiments thereof, given by way of example only with reference to the accompanying drawings, in which.

DETAILED DESCRIPTION

Figure 1:
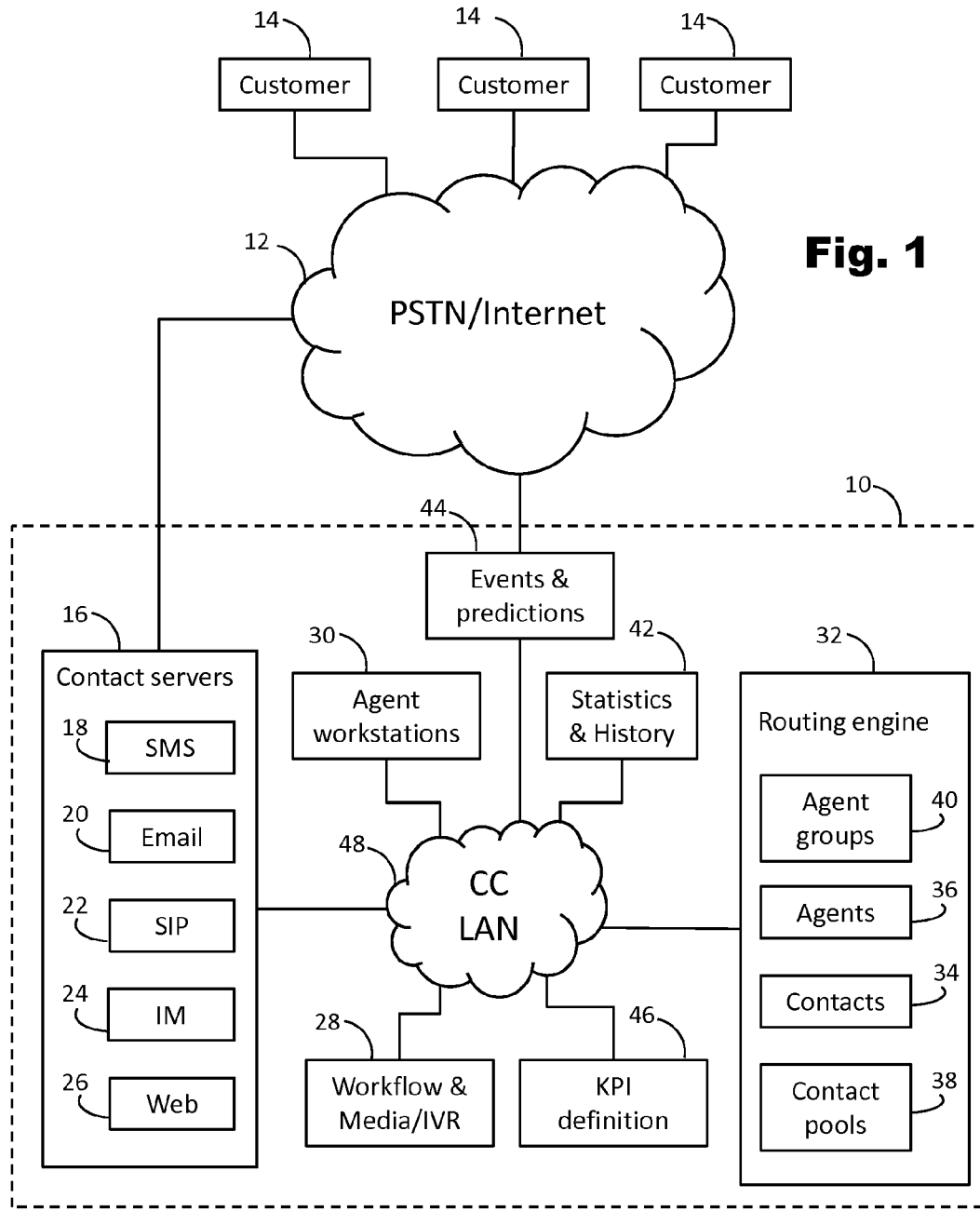
FIG. 1 is an architecture of a contact center system connected to customers via public networks in accordance with an embodiment of the present invention.

In FIG. 1 there is shown a contact center 10 connected to public communications networks such as the public switched telephone network (PSTN) and Internet 12. Customers 14 may connect to the contact center 10 in known manner, either as inbound calls to the contact center or outbound calls from the contact center. Various different media types may be used to connect such as by voice and video calls, emails, instant messaging (IM), by web submissions and so forth. A plurality of contact servers 16 are provided in the contact center 10 to handle such contacts, including a short message service (SMS) server 18 to handle text messages, email server 20, a session initiation protocol (SIP) server 22 to handle voice calls, an IM server 24 to handle instant messaging and chat services, and a web server 26. Other arrangements are also possible to cater for the same or different media types in known manner, or to take account of new technologies and protocols. For example there may also be a fax server and a document management system for handling scanned paper communications.

Communications sessions and other contacts received at the media servers 16 are handled in accordance with pre-defined workflows and optionally submitted to various media treatments such as interactive voice response (for voice calls) or automated scripts (for emails, instant messages and web contacts), and such workflows are handled by a workflow and media/IVR system 28, again in known fashion. In general, unless a contact is disposed of by automated treatment, it will need to be routed to a human agent at a workstation 30 for handling. Typical contact centers will have hundreds of such agent workstations, either on-site or connected remotely (e.g. home agents).

The treatment of a contact through the workflows, along with intrinsic qualities of the contact itself (e.g. originating number, email or IP address, dialled number, country code, username etc.) permits a contact to be tagged or classified in such a way that the qualities of the contact and hence the requirements of an agent to service the contact, are known and are recorded in a contact record 34 shown as part of a routing engine 32.

Similarly, for each agent, an agent record 36 is maintained with the agent's status, current contact assignments, agent properties and abilities, and so on. In the contact center shown, contacts are placed into one or more contact pools 38 according to the tags allocated to each contact, and each contact pool has one or more associated agent groups 40 containing those agents who have been assigned to service contacts from that pool.

The allocation of a particular contact within a contact pool 38 to an agent in an agent group 40 may be decided by the system according to routing algorithms, or may be left to the selection by agents of particular contacts, so that an agent may choose whichever contact he or she wishes. Various mechanisms can be put in place to ensure a reliable handling time, such as by increasing the priority of a contact as it ages within a pool.

A statistics and history server 42 is provided with a feed of all relevant events occurring at the contact center, such as contacts connecting and disconnecting, agents becoming available and unavailable, contacts being assigned to agents, sales made to customers by agents, and so on. In known manner this information is stored, categorized and analyzed to allow better management of the contact center. In particular the statistics and history server will include records of all relevant agent performance data, which might include detailed histories as well as averages over defined time periods of an agent's handling times, wrap-up times, revenue per call, number of concurrent contacts, percentage of contacts handled without referral to another agent or supervisor, and so on. Such performance data is used to evaluate an agent score against performance indicators as is described herein.

An events and predictions function is shown at 44 in communication with the internet. The purpose of this component is to make predictions of activity levels for various types or groups of contacts based on current and historical activity levels and external events which may be monitored by subscribing to web feeds (for example an airline site might monitor weather RSS feeds and news feeds to detect anomalous patterns from which increased or decreased numbers of contacts of various types may be predicted; or a technical helpline for an antivirus software company might monitor the numbers of messages being posted to virus-related forums and websites to get early warning of increased virus activity).

A key performance indicator (KPI) definition unit 46 maintains records of key performance indicators input by supervisors and administrators of the contact center against which agent performance data is to be evaluated and scored. Various ways of defining such KPIs can be employed including generating a dummy agent profile with a number of desired (or undesired) characteristics, or selecting a real agent to use as a model (again either a desired or undesired model) against which agents can be scored, or a program interface may simply allow users of the system to select from a dropdown list any one of a number of possible KPIs and to define a target value for that KPI, to thereby generate a composite query containing a number of KPI parameters.

Additionally or alternatively, for one or more KPIs the user may be spared the task of defining a target value where there is a theoretical "best" or "worst" value against which agents may be scored. For example if customers are requested to rate an interaction with an agent at the conclusion of a contact session from 1 (worst) to 5 (best), then instead of selecting this rating as a KPI and inputting a target value, the system may assume that the target value against which agents are to be scored is the best value of 5.

The KPI definition unit 46 has an interface which may form part of the normal supervisor's workstation interface—thus this interface is integrated into a conventional supervisor workstation program, from which the supervisor can access and configure the KPI definitions, as well as other parameters for setting up agent group definitions and sizes as will be described further below.

Communication between the various components of the contact center occurs over a contact center local area network (LAN) 48 using conventional protocols and technology.

It should be noted that while the overview above is described mostly in terms of inbound contacts, the contact center will typically also deal with outbound campaigns, either by assigning particular agents with a feed of outbound communications (e.g. by a predictive dialler) or by mixing inbound and outbound contacts, which can be done by representing outbound communications as contacts which are pooled and assigned to agents.

The above description is of a simplified contact center and it will be appreciated that only the details relevant to the present invention are described. The skilled person will be aware that a real contact center will have a far greater degree of complexity, but for simplicity such details are omitted here but will be readily apparent to one of skill in the art.

The operation of the method of grouping agents is as follows: using the KPI definition interface, a user records a set of one or more KPIs against which agents are to be scored. The scoring can apply to all agents or to selected subsets of agents. For each agent to be evaluated, the statistics and history server is consulted to retrieve performance data relative to the or each specified KPI, and an evaluation score is generated for the agent according to how closely the agent approximates the required value for each KPI, or according to whether the agent overshoots or undershoots the required value.

When all agents have been assigned an evaluation score, the agents can be ranked in terms of their performance relative to the KPIs recorded using the KPI definition interface. Agents are then assigned to the agent groups depending (at least in part) on their evaluation scores, so that for example the top 10% of agents or the bottom 25% of agents are grouped together in an agent group, which may then be used either for generating ad hoc reports or for assigning contacts from particular pools to the agents in those groups.

Using the events & prediction system, the relative sizes of the agent groups may be dynamically and automatically adjusted to account for actual or predicted changes in the numbers of different contact groups, with agents being reassigned among the re-sized agent groups according to their evaluation scores.

Figure 2:
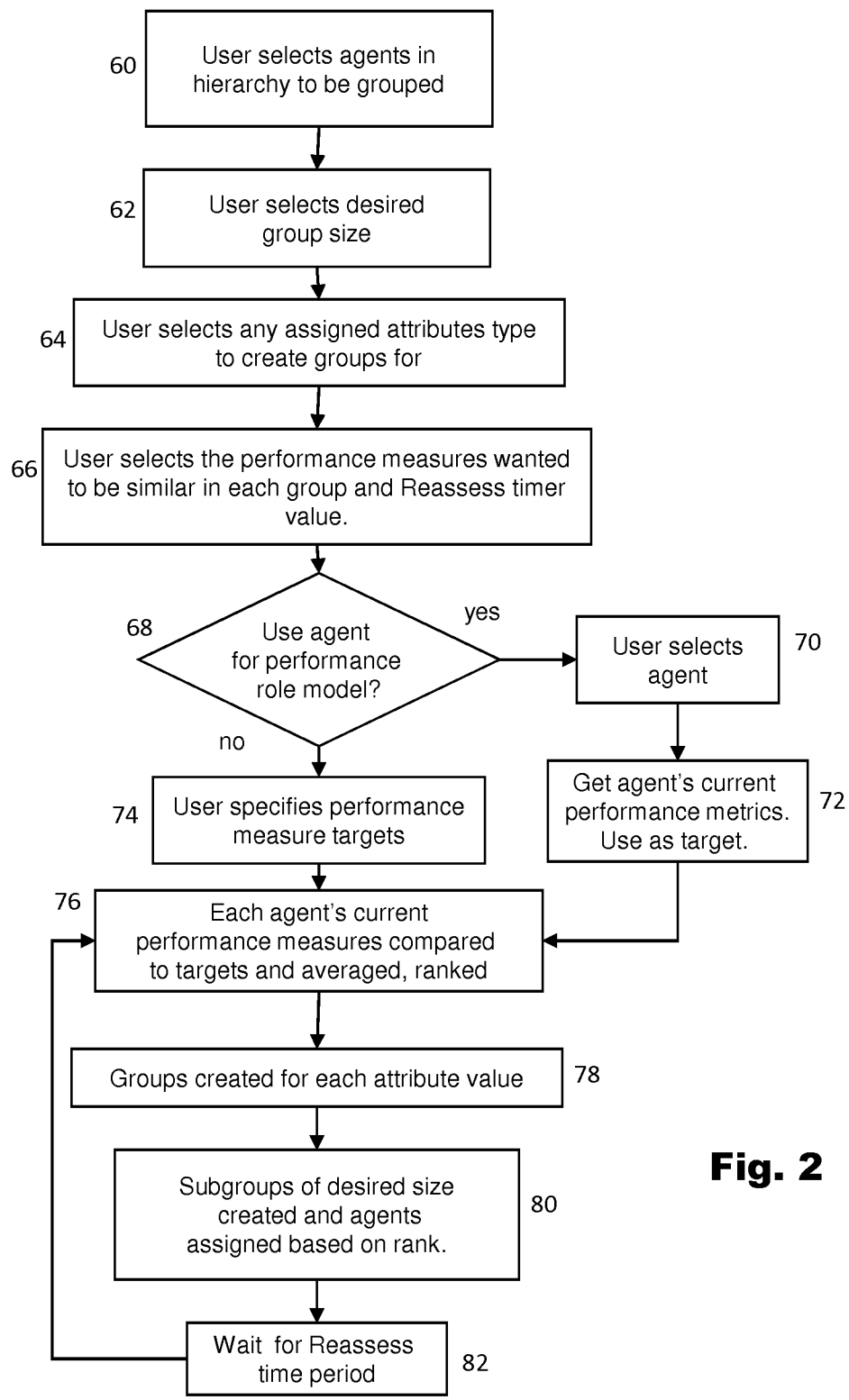
FIG. 2 is a flowchart illustrating a method of grouping agents in accordance with an embodiment of the present invention.

Referring now to FIG. 2, there is shown a flowchart of a first method for assigning agents to groups. The flowchart is shown in terms of the inputs which a user (i.e. administrator or supervisor) of a contact center would make in the KPI definition interface 46 of FIG. 1, in combination with operations performed by the routing engine 32 of FIG. 1 which is programmed to perform the steps of the method in communication with the other contact center components. It will be appreciated that this functionality can be programmed into a generally purpose computer or a dedicated piece of processing hardware, either stand-alone or distributed.

In step 60, the user selects agents from within the hierarchy of the contact center to be grouped. For example agents of a particular department, or from a certain shift, or from a particular site, or a grouping of agents organised by some other criteria may be specified here. For example, a supervisor may select all agents under his or her supervision.

In step 62 the user may select a desired group size, such as in identifying the top ten agents, or the middle 50 agents, or the bottom 25% of the selected agents. The user may, in step 64, specify particular attribute types to create separate groups for, such as language, so that separate groups can be created for each value of an attribute type.

In step 66, the user selects the performance measures (metrics) to be used, such as average handling duration and average revenue per call. The user may also specify the reassess time period, i.e. the frequency according to which the agents are reassessed and reassigned into groups as will be described further below. In decision 68, the user decides whether to use a particular agent for the role model, i.e. to retrieve the performance metric values for an agent, or to manually specify performance metric values. If the decision is taken to use an agent ("yes"), then in step 70 the user selects the agent and in step 72 the system retrieves from the statistics and history server or database the relevant values for that agent before proceeding to step 76.

Alternatively, if the user, at decision 68 opts not to use an actual agent's values, then in step 74, the user enters performance metric values (for example average handling duration 2 minutes 40 seconds and average revenue $128).

Step 76 compares, for each agent, the agent's performance data for the specified metrics against the target values, either those specified by the user in step 74 or those of the selected agent retrieved in step 72. As described further below, the values for each agent are compared and, where several metrics or parameters have been used, weighting can be applied to result in an evaluation score for each agent against the metrics, e.g. 122%, 117%, 103%, 98%, 97% and so on to result in an ordered ranking of agents against the specified KPIs.

After scoring each agent's performance data, attribute groups are created for each attribute value, such as by dividing the agents into English, Portuguese and Hindi attribute groups, step 78. Then, within each such attribute group, in step 80 agent groups are created of the desired size (for example dividing each language into four agent groups consisting of the top quarter, second quarter, third quarter and bottom quarter of agents), and the agents are assigned into the relevant agent group according to rank using the evaluation score.

In step 82, a timer waits for the reassess time period (which can be user specified or according to a system default, or which may be event-driven, e.g. agents may be reassessed and their score re-evaluated after every call completes), at which point the process loops back to step 76 to re-evaluate the agents are reassign them to groups based on any changes in their evaluations.

The agent scores may of course be generated with reference to any desired performance metric or combination of metrics, and various methods of assigning a score with reference to performance metrics may be employed.

One example is to determine an evaluation score S by evaluating for each agent the expression:

$$S = \sqrt{\sum_{i=1}^{n} c_i (q_i - p_i)^2}$$

where $c_i$ represents a weighting constant.

This method of determining an evaluation score is based on an n-space Euclidian distance, with each performance metric $p_i$ and the corresponding data point $q_i$ representing a respective distance along a respective axis from an origin, so that the equation evaluates the overall "distance" of the agent's performance data point $(q_1, q_2, \ldots q_n)$ from the reference point $(p_1, p_2, \ldots p_n)$. The weighting constant permits adjustment of disparate values for different metrics. For example if one metric is "sales" expressed as a dollar amount (e.g. with a desired reference value of 10,000) and another metric is "handling time" expressed in seconds (e.g. with a desired target of 120) a large weighting factor might be applied to the handling time to boost the importance of a five second improvement in handling time relative to a five dollar improvement in sales.

Thus, where the performance metrics have three elements $p_1, p_2, p_3$, and assuming that no weighting factor is required ($c_1=c_2=c_3=1$), then the score for an agent with performance data $q_1, q_2, q_3$ will be:

$$S = \text{SQRT}((q_1-p_1)^2 + (q_2-p_2)^2 + (q_3-p_3)^2)$$

As an example, consider five agents with the following performance data, when compared against a supervisor-defined set of performance metric targets as shown in the bottom row of Table 1:

| Agent | Hold time (s) | Wrap up time (s) | Handling time (s) |
| --- | --- | --- | --- |
| Andrew | 22 | 17 | 132 |
| Bethany | 18 | 17 | 137 |
| Jennifer | 20 | 22 | 124 |
| Ali | 12 | 16 | 145 |
| Jose | 15 | 24 | 130 |
| Target | 10 | 15 | 120 |

The score for Andrew, assuming all factors carry a weighting of $c_i=1$, is calculated as:

$$S = \text{SQRT}((22-10)^2 + (17-15)^2 + (132-120)^2) = 17.1$$

Similarly the scores for Bethany, Jennifer, Ali and Jose, respectively are calculated as 18.9, 12.8, 25.1 and 14.3. This leads to a ranked listing with the best (lowest) scores first as follows:
{Jennifer; Jose; Andrew; Bethany; Ali}

If a different weighting is applied, however, so that the impact of handling time is reduced by setting the weighting constant for handling time to 0.5, and the weighting for hold time is increased by setting its weighting constant to 2, while leaving the weighting constant for the wrap up time unchanged at 1, then the score for Andrew is calculated as:

$$S = \text{SQRT}(2*(22-10)^2 + 1*(17-15)^2 + 0.5*(132-120)^2) = 19.1$$

Similarly, the scores for Bethany, Jennifer, Ali and Jose, respectively are calculated as 16.6, 16.0, 17.9 and 13.5. This leads to a ranked listing with the best (lowest) scores first as follows:
{Jose; Jennifer; Bethany; Ali; Andrew}

By changing the weighting, different factors can be emphasised, with the best performing agents assigned to different groups from the worst performing agents. In a real situation, high priority customers might be assigned to a group of agents selected as the best performing using an algorithm which emphasised customer satisfaction ratings or dollar sales over call handling time. A further implication of this example is that if Andrew improves performance on call hold time (which has been arbitrarily given a high weighting for purely illustrative purposes), then Andrew's score will improve dramatically and accordingly, Andrew's position within the rankings will improve.

Care needs to be taken with this method of evaluating an agent score in this manner as it treats overachievement and underachievement equally. For example if a desired handling time is expressed as 120 (seconds) then a corresponding agent performance of 100 seconds will be equally distant from this target as a corresponding agent performance of 140 seconds.

This problem does not arise where the target level is set higher than the level actually achieved by any agent.

It will therefore be appreciated that this may be corrected by applying a different weighting where overachievement is found to have occurred (as an arbitrary example: $c_1=5$ where $q1>p1$, and $c_1=0.75$ where $q1<p1$), or indeed by using a different scoring algorithm to evaluate agent performance against a desired target.

An alternative algorithm to evaluate performance data against a performance metric is to define for each performance metric a base value b and a target value t, and to evaluate, for a performance data value d the expression (|d−b|)/(|t−b|) so that for example for the handling time has a base (worst) value of b=300 seconds and a target value of t=120 seconds, then two agents with respective average handling times of d=100 and d=140 seconds respectively would be assigned scores (for this single performance metric) of 1.111 and 0.889 respectively. Such scores could equally be expressed in percentage terms as 111% and 89% of target respectively.

As before, these individual scores can be combined with other scores in weighted sums so that for each of a set of n performance metrics defined by a base and target pair (b,t) and having a corresponding performance data value d, the evaluation score is calculated as:

$$S = \sqrt{\sum_{i=1}^{n} c_i \left( \frac{|d_i - b_i|}{|t_i - b_i|} \right)^2}$$

where each performance metric has a respective weighting factor c.

Figure 3:
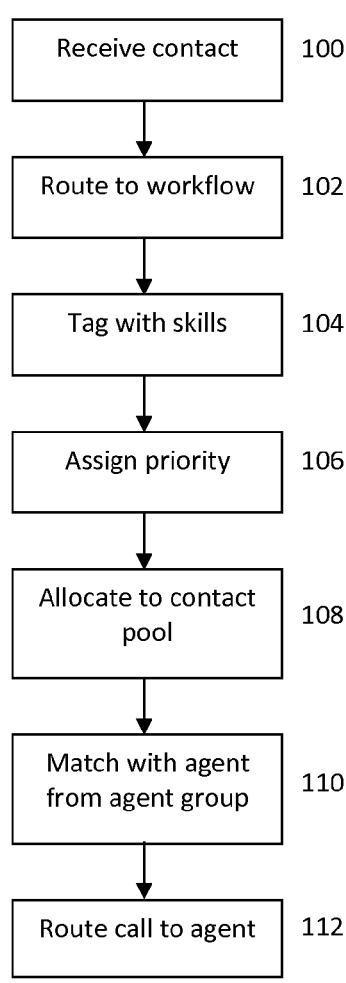
FIG. 3 is a flowchart illustrating a method of routing a contact to an agent in accordance with an embodiment of the present invention.

FIG. 3 shows a flowchart of how a contact may be assigned to an agent. In step 100 a contact is received at a contact center, and is routed to a workflow, step 102. Typically, this will involve pre-processing using an interactive voice response (IVR) system to glean information about the contact and assist in better routing, with additional information being available from intrinsic contact data such as the originating number, dialled number, user ID, account number, etc.

In step 104 the contact is tagged with skill requirements and in step 106 the contact is tagged with a priority rating. In step 108, the contact is allocated to one or more of several contact pools. Each contact pool is serviced by one or more of the agent groups described previously, so that for example an agent group might contain the middle 75% of agents as ranked according to an evaluation score based on a composite of ability in a particular skillset, average handling time and customer rating, and such an agent group might be assigned to service a contact pool containing medium priority contacts tagged with the skillset in question.

In step 110, the contact is matched with an agent from the agent group. This can be done automatically, for example in round robin fashion, or by matching additional attributes of the contact and agent, or by agent selection of the contact from a pool, or in any other way. Once the match has occurred and the agent is free to handle the contact, the contact is routed to the agent, step 112, e.g. by playing a standard greeting and connecting the call to the agent's workstation. (Although described in terms of calls, the same procedure can be followed for contacts of other media types such as instant messaging, email, etc.)

Figure 4:
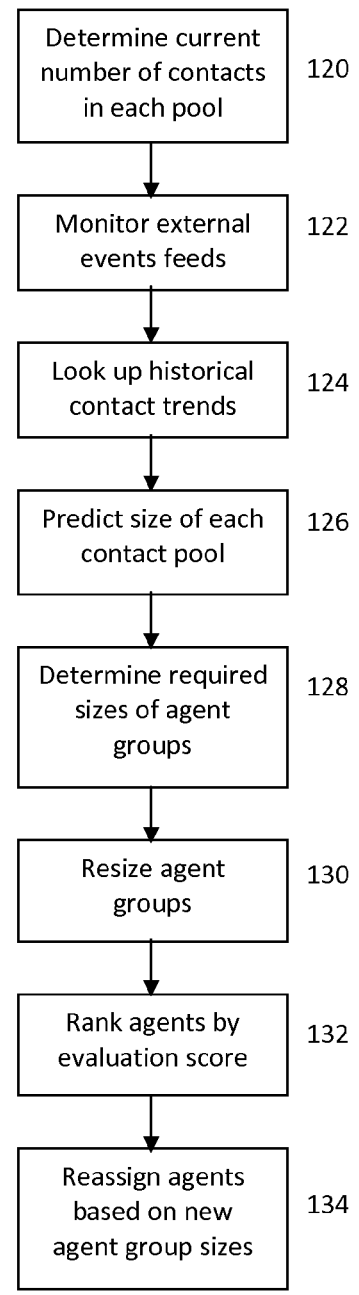
FIG. 4 is a flowchart of a further method of grouping agents based on contact levels in accordance with an embodiment of the present invention.

FIG. 4 shows an improvement on the basis system for allocating agents to groups as described in FIG. 2. In the modification of FIG. 4, the size of the agent groups is dynamically adjusted to take into account the numbers of contacts of different types and the servicing requirements for those contacts.

In step 120, the number of contacts in each contact pool is initially evaluated. Step 122 monitors external feeds (such as RSS feeds, weather data, news feeds, and inputs made by users of the system notifying of anomalous events) for indications of events that are suggestive of a change in the current pattern of contacts. This might for example be an increase in contacts of a particular priority or contacts requiring particular agent skills.

In step 124, the historical contact trends are consulted. This might involve looking at how the mix and absolute numbers of contacts have changed historically based on time of day, week, month or year, or based on some other cyclical event (e.g. on the day after a new software version release for a particular product). The historical trends can also be analysed in conjunction with the external events data (for example, what trends occurred on the previous three occasions a snowstorm shut down at least two New York airports). Based on steps 120, 122 and 124, a prediction is made in step 126 of the expected size of each contact pool. The actual algorithm used to make this prediction, and the extent to which this relies on each of steps 120, 122 and 124, is matter for system design and will usually be tailored to the particular business needs of a contact center. It is to be understood that each of steps 120, 122 and 124 can be optional, i.e. a prediction can be made based only on current contact levels, or only on external feeds, or only on historical trends, or on any combination of these factors.

The prediction of contact numbers in each pool forms the basis for step 128, in which a determination is made of the servicing requirements in terms of the numbers of agents required in each agent group. It is not always that case that the numbers of agents will be in proportion to the numbers of contacts to be serviced by those agents, as some contact pools will have a high throughput and therefore require fewer agents per contact, while agents dealing with higher priority customers or more complex issues will have a lower agent: contact ratio.

Based on the size requirements, the agent groups are re-sized, step 130. Step 130 can be seen as overwriting or repeating the initial determination of group size in step 66 of FIG. 2. Then, the agents are re-ranked according to evaluation score, step 132, and assigned to the re-sized groups as appropriate based on the new group sizes, step 134, which is a repetition of step 80 in FIG. 2.

Preferably the process of FIG. 4, like that of FIG. 2 is repeated periodically so that agents are periodically reassessed for evaluation score and moved between groups to reflect their updated rakings (FIG. 2), while the group sizes themselves are periodically readjusted to take account of actual or anticipated traffic levels for different kinds of contacts, with rebalancing and reallocation of agents among groups accordingly, (FIG. 4).

The present invention is not limited to the described embodiments which may be modified or varied without departing from the spirit and scope of the claimed invention.

We claim:

1. A method of assigning contact center agents to groups, the method performed by a processor in a computing system of a contact center, comprising the steps of:
   (a) maintaining, for a set of contact center agents associated with a contact center, performance data relating to the activities of the contact center agents;
   (b) specifying one or more performance metrics against which the performance data of the contact center agents may be evaluated by specifying a number, n, of performance metrics P in numerical form as a set of values ($p_1$, $p_2, \ldots p_n$), and further comprising expressing, for each of the plurality of agents, a corresponding set of performance data Q in numerical form as a set of values ($q_1$, $q_2, \ldots q_n$);

(c) determining an evaluation score for each of a plurality of the contact center agents against the performance metric(s) based on the performance data by evaluating for each agent the expression:

$$S = \sqrt{\sum_{i=1}^{n} c_i(q_i - p_i)^2}$$

wherein $c_i$ represents a weighting constant; and (d) assigning the plurality of contact center agents among a plurality of agent groups according to each agent's respective evaluation score.

2. The method of claim 1, wherein the step of specifying one or more performance metrics comprises creating an agent profile having a desired set of characteristics expressed as the one or more performance metrics, and wherein the step of determining an evaluation score evaluates the extent to which each of the plurality of agents matches that agent profile.

3. The method of claim 2, wherein the agent profile is based on performance data for an agent of the contact center.

4. The method of claim 1, further comprising the steps of: updating the performance data for the set of agents over time; and repeating steps (c) and (d) to thereby dynamically update the assignment of agents among agent groups to take into account the updated performance data.

5. The method of claim 1, wherein the step of assigning the plurality of contact center agents among a plurality of agent groups comprises selecting, from a ranked list of the evaluation scores, a subset of consecutively ranked scores, and assigning to a group those agents represented by the subset.

6. The method of claim 5, wherein the step of assigning the plurality of contact center agents among a plurality of agent groups comprises maintaining a set of M agent groups and dividing the ranked list of the evaluation scores into M subsets, each subset comprising a number of consecutively ranked scores, and assigning to each of the M agent groups those agents represented by one of the M subsets of consecutively ranked scores.

7. The method of claim 1, further comprising the step of defining a size of one or more of the agent groups and assigning to the one or more of the agent groups a number of agents in accordance with the defined size.

8. The method of claim 7, wherein the step of defining a size of one or more groups comprises defining a number of agents for each of the one or more agent groups.

9. The method of claim 7, wherein the step of defining a size of one or more groups comprises defining a relationship between the respective sizes of the one or more agent groups, and assigning the agents in proportion to the relationship.

10. The method of claim 7, wherein the step of defining a size of one or more groups comprises determining a contact service requirement based on actual or anticipated numbers of contact to be serviced by the one or more groups and defining the size of the one or more agent groups to meet the contact service requirement.

11. The method of claim 10, wherein the contact service requirement is determined by predicting contact numbers based on historical trends.

12. The method of claim 10, wherein the contact service requirement is determined by predicting contact numbers based on inputs defining events external to the contact center.

13. The method of claim 10, wherein the contact service requirement is adjusted in real time to take account of current contact numbers.

14. The method of claim 1, further comprising generating a report of activity at the contact center using the agent groups as a report parameter.

15. The method of claim 1, further comprising assigning a contact to an agent by allocating the contact to one of the agent groups and matching the contact to an agent within the one of the agent groups.

16. The method of claim 1, further comprising the steps of defining one or more agent attributes, filtering the set of agents according to the one or more attributes to arrive at an attribute-specific subset of agents, and performing the step of assigning the plurality of contact center agents among a plurality of agent groups for each attribute-specific subset of agents.

17. The method of claim 1, further comprising:

(e) allocating a set of contacts requiring service at the contact center between a plurality of contact groups, each contact group being associated with one or more of the agent groups;

(f) based on the relative resources required to service each of the contact groups, calculating a corresponding size requirement for the one or more agent groups associated with each contact group; and (g) reassigning the plurality of contact center agents among the plurality of agent groups in proportion to the calculated size requirements and according to each agent's respective evaluation score.

18. The method of claim 17, wherein the step of allocating the set of contacts between a plurality of contact groups involves looking at current or historical contact numbers having shared characteristics.

19. The method of claim 17, wherein the step of allocating the set of contacts between a plurality of contact groups involves predicting contact numbers.

20. A method of routing a contact at a contact center to an agent of the contact center, by a processor in a computing system of the contact center, comprising the steps of:

(a) maintaining, for a set of contact center agents associated with a contact center, performance data relating to the activities of the contact center agents;

(b) specifying one or more performance metrics against which the performance data of the contact center agents may be evaluated by specifying a number, n, of performance metrics P in numerical form as a set of values ($p_1$, $p_2, \ldots p_n$), and further comprising expressing, for each of the plurality of agents, a corresponding set of performance data Q in numerical form as a set of values ($q_1$, $q_2, \ldots q_n$);

(c) determining an evaluation score for each of a plurality of the contact center agents against the performance metric(s) based on the performance data by evaluating for each agent the expression:

$$S = \sqrt{\sum_{i=1}^{n} c_i(q_i - p_i)^2}$$

wherein $c_i$ represents a weighting constant;

(d) assigning the plurality of contact center agents among a plurality of agent groups according to each agent's respective evaluation score;
(e) receiving a contact and allocating the contact to at least one agent group based on a characteristic of the contact; and
(f) assigning the contact to an agent within the at least one agent group.

21. A computer program product comprising a non-transitory data carrier encoding instructions which when executed by a processor in a computing system associated with a contact center, cause the computing system to:
(a) maintain, for a set of contact center agents associated with a contact center, performance data relating to the activities of the contact center agents;
(b) specify one or more performance metrics against which the performance data of the contact center agents may be evaluated by specifying a number, n, of performance metrics P in numerical form as a set of values ($p_1$, $p_2$, ... $p_n$), and further comprising expressing, for each of the plurality of agents, a corresponding set of performance data Q in numerical form as a set of values ($q_1$, $q_2$, ... $q_n$);
(c) determine an evaluation score for each of a plurality of the contact center agents against the performance metric(s) based on the performance data by evaluating for each agent the expression:

$$S = \sqrt{\sum_{i=1}^{n} c_i (q_i - p_i)^2}$$

wherein $c_i$ represents a weighting constant; and
(d) assign the plurality of contact center agents among a plurality of agent groups according to each agent's respective evaluation score.

22. The computer program product of claim 21, wherein the computing system is further caused to:
(e) receive a contact and allocating the contact to at least one agent group based on a characteristic of the contact; and
(f) assign the contact to an agent within the at least one agent group.

23. A contact center system comprising:
(a) a data store in which performance data relating to the activities of a set of contact center agents associated with a contact center are stored;
(b) a performance metric definition record in which a performance metric is recorded against which the performance data of the contact center agents may be evaluated by specifying a number, n, of performance metrics P in numerical form as a set of values ($p_1$, $p_2$, ... $p_n$), and further comprising expressing, for each of the plurality of agents, a corresponding set of performance data Q in numerical form as a set of values ($q_1$, $q_2$, ... $q_n$);
(c) a processor programmed to determine an evaluation score for each of a plurality of the contact center agents against the performance metric(s) based on the performance data by evaluating for each agent the expression:

$$S = \sqrt{\sum_{i=1}^{n} c_i (q_i - p_i)^2}$$

wherein $c_i$ represents a weighting constant; and (d) an agent group record defining a plurality of agent groups and recording details of the allocation of the plurality of contact center agents among the plurality of agent groups according to each agent's respective evaluation score.

24. The contact center system of claim 23, further comprising:
(e) a contact handling system programmed to allocate a contact at the contact center to at least one agent group based on a characteristic of the contact, whereby the contact may be subsequently assigned to an agent within the at least one agent group.

25. A method of assigning contact center agents to groups comprising the following steps carried out by a processor in a computing system of a contact center:
(a) maintaining, for a set of contact center agents associated with a contact center, performance data relating to the activities of the contact center agents;
(b) specifying one or more performance metrics against which the performance data of the contact center agents may be evaluated by defining for each of a set of n performance metrics a base value b and a target value t;
(c) determining an evaluation score for each of a plurality of the contact center agents against said performance metric(s) based on a corresponding set of performance data values d, the evaluation score being calculated as:

$$S = \sqrt{\sum_{i=1}^{n} c_i \left( \frac{|d_i - b_i|}{|t_i - b_i|} \right)^2}$$

wherein $c_i$ represents a weighting constant; and
(d) assigning the plurality of contact center agents among a plurality of agent groups according to each agent's respective evaluation score.

26. A computer program product comprising a non-transitory data carrier encoding instructions which when executed by a processor in a computing system associated with a contact center, cause the computing system to:
(a) maintain, for a set of contact center agents associated with a contact center, performance data relating to the activities of the contact center agents;
(b) specify one or more performance metrics against which the performance data of the contact center agents may be evaluated by defining for each of a set of n performance metrics a base value b and a target value t;
(c) determine an evaluation score for each of a plurality of the contact center agents against said performance metric(s) based on a corresponding set of performance data values d, the evaluation score being calculated as:

$$S = \sqrt{\sum_{i=1}^{n} c_i \left( \frac{|d_i - b_i|}{|t_i - b_i|} \right)^2}$$

wherein $c_i$ represents a weighting constant; and
(d) assign the plurality of contact center agents among a plurality of agent groups according to each agent's respective evaluation score.

27. A contact center system comprising:
(a) a data store in which performance data relating to the activities of a set of contact center agents associated with a contact center are stored;

(b) a performance metric definition record in which a performance metric is recorded against which the performance data of the contact center agents may be evaluated by defining for each of a set of n performance metrics a base value b and a target value t;

(c) a processor programmed to determine an evaluation score for each of a plurality of the contact center agents against said performance metric(s) based on a corresponding set of performance data values d, the evaluation score being calculated as:

$$S = \sqrt{\sum_{i=1}^{n} c_i \left( \frac{|d_i - b_i|}{|t_i - b_i|} \right)^2}$$

wherein $c_i$ represents a weighting constant; and (d) an agent group record defining a plurality of agent groups and recording details of the allocation of the plurality of contact center agents among the plurality of agent groups according to each agent's respective evaluation score.

* * * * *